Feb. 20, 1940.    E. W. CLARK    2,191,337
MELTING APPARATUS
Filed Dec. 8, 1938    2 Sheets-Sheet 2
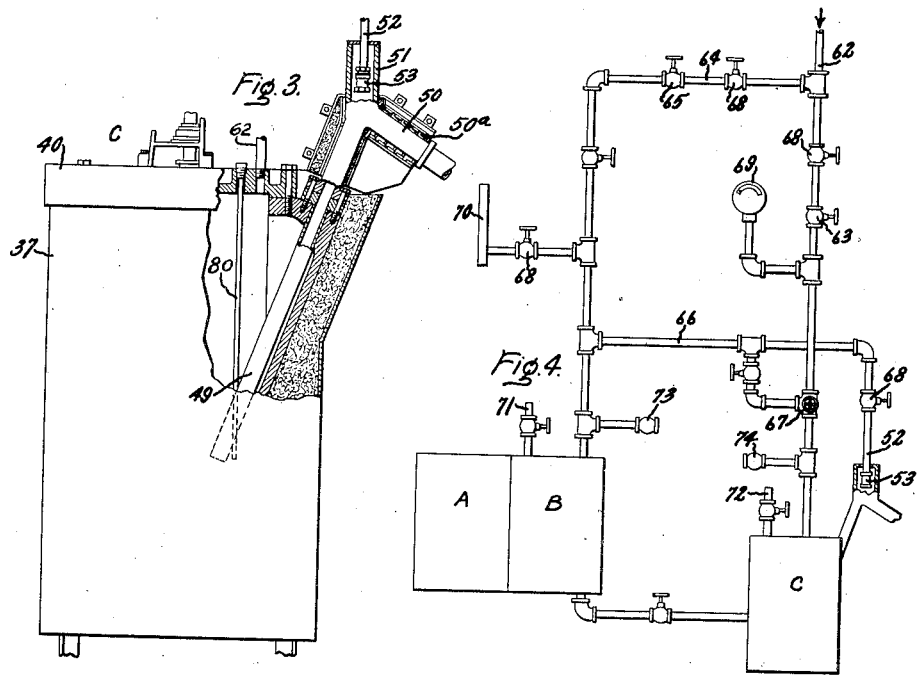
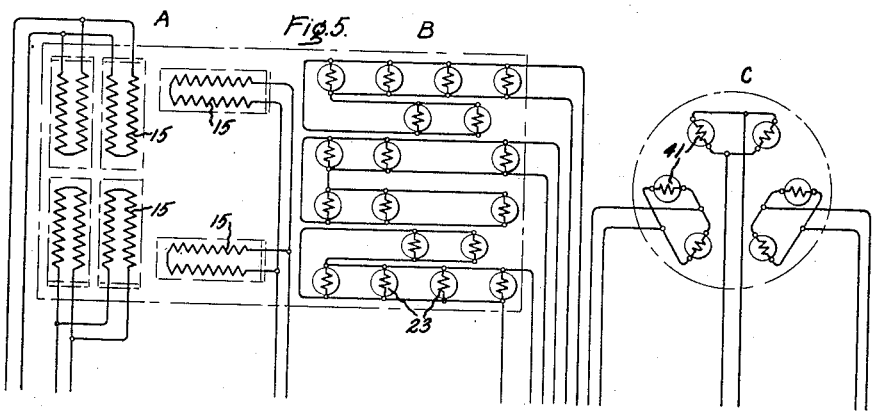
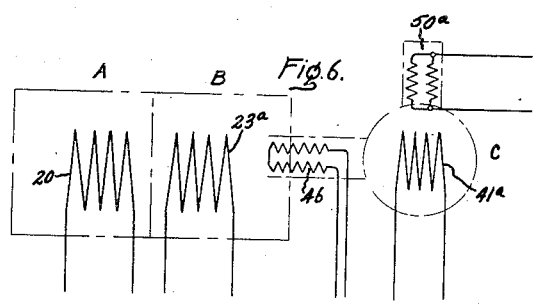
Inventor:
Ernest W. Clark,
by Harry E. Dunham
His Attorney.

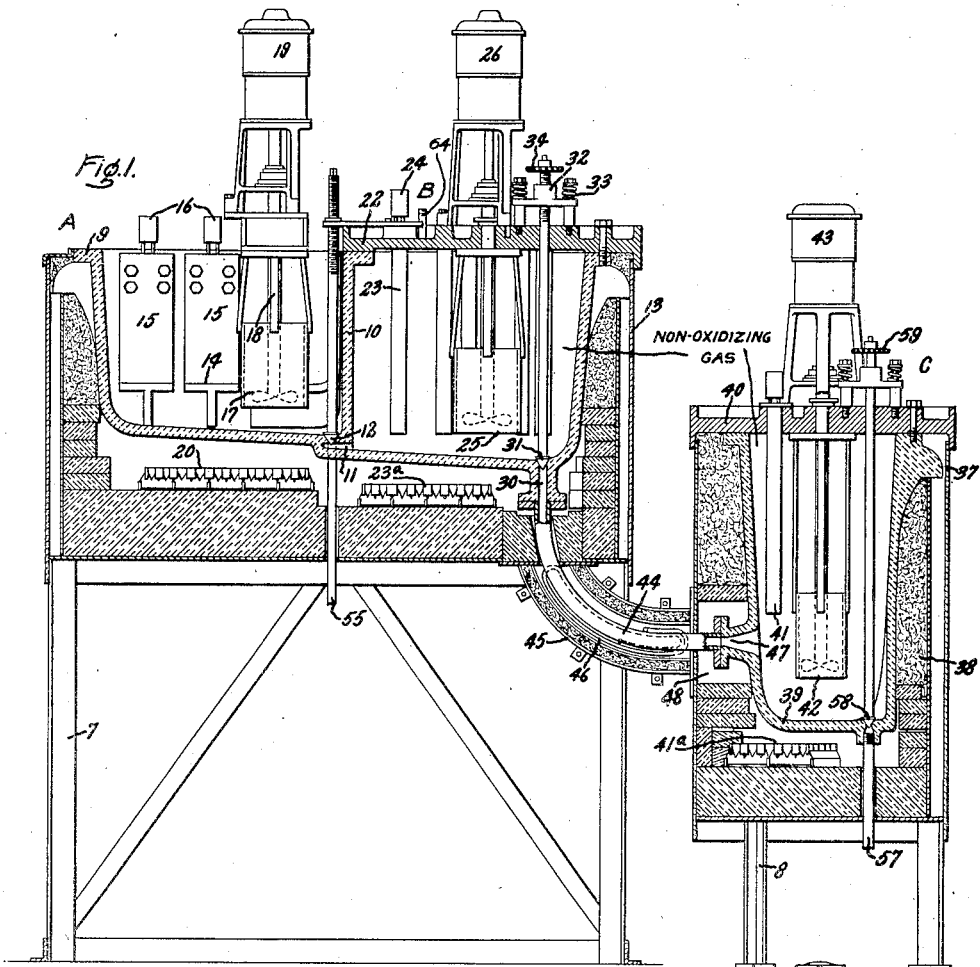

Patented Feb. 20, 1940

2,191,337

UNITED STATES PATENT OFFICE 2,191,337

MELTING APPARATUS

Ernest W. Clark, Schenectady, N. Y., assignor to General Electric Company, a corporation of New York Application December 8, 1938, Serial No. 244,627

15 Claims. (Cl. 266—33)

The present invention relates to melting apparatus and is more specially intended for melting pig lead and alloys for use in hydraulic presses designed to apply sheaths to electric power cables.

The object of the invention is the provision of improved melting apparatus in which the temperatures may be accurately controlled and in which the material after being melted is protected from oxidation and at the same time closely controlled as to temperature.

For a consideration of what I believe to be novel and my invention, attention is directed to the accompanying description and the claims appended thereto.

In the drawings which are illustrative of my invention, Fig. 1 is a sectional view of the apparatus; Fig. 2 is a plan view thereof; Fig. 3 is a view partly in elevation and partly in section of the pouring pot and discharge spout therefor; Fig. 4 is a diagram of the piping arrangement; Fig. 5 is a diagrammatic view of the immersion heaters and the circuits thereof, and Fig. 6 is a diagrammatic view of auxiliary heaters and circuits thereof.

Briefly stated, the apparatus comprises three heated pots or sections, A, B and C, the first being open to the atmosphere, the second sealed against atmospheric conditions and receiving material from the melting pot and serving as a storage means for the material, and the third a sealed pouring pot receiving molten material from the second pot, the materials in the second and third pots being subject to neutral or non-oxidizing gas of which nitrogen, $CO_2$ or steam may be regarded as examples. The molten material such as lead or a lead containing alloy is discharged from the pouring pot by means of gas under pressure through a pouring spout which is so arranged as to be self draining, there being provision for preventing the entrance of air to the pot between pouring operations. In the apparatus shown, the capacity is approximately 22,000 pounds, divided as follows: in the melting section or pot A 6000 pounds, in the second pot or storage section or pot B 12,000 pounds, and in the pouring section or pot C 4000 pounds. It is designed to pour at the rate of from 1000 to 1500 pounds per charge at about fifteen minute intervals. These figures are given merely as illustrations and not as limitations of my invention.

Referring particularly to Figs. 1 and 2, 7 indicates a suitable framework for supporting the melting and storage pots A and B, and 8 a framework for supporting the pouring pot C. The melting and storage pots comprise a cast iron member 9 having a vertical partition 10 between the pots, there being a discharge port 11 between the two subject to the control of a manually operated valve 12, the stem of which rises above and is supported by the cover of pot B. The pots are located within a suitable metal casing 13, there being suitable fire brick or other heat resisting linings between it and the outer wall of the pots. In the melting pot which is open to the atmosphere are platforms 14 elevated above the bottom of the pot and supported thereby to receive the pigs of lead. The object of these elevated platforms is to decrease the liability of oxides, dross and other impurities from flowing with the melted lead into the storage pot or section when the valve 12 is opened and to permit lead pigs to come in direct contact with the heating units. Associated with and forming parts of platforms are immersion electric heaters 15 which may be of any suitable or well known construction, the detail construction of which is not material to my invention. These heaters have terminals 16 for connecting them to a suitable source of current supply.

Since it is desirable in many cases to agitate the molten metal in order to facilitate the removal of impurities from the lead and afford an opportunity for them to rise to the top of the pot where they may be skimmed off, a stirrer is provided of which a propeller 17 for forcing lead upward is suitable for the purpose. The propeller is mounted on the lower end of a shaft 18 which is rotated at a suitable controlled speed by the electric motor 19. The propeller is located within a tubular enclosure which is open at both ends. The stirrer is particularly necessary where the metal instead of being pure lead is an alloy, the constituent parts of which have a tendency to separate. Where substantially pure lead is melted, it is not always necessary to use stirrers in this and the other pots. In order to assist the immersion heaters 15 in starting the apparatus when cold and containing more or less solidified lead, and also to raise the amount of heat supplied to the pot, auxiliary heaters 20 are provided located between the lining of the casing 13 and the bottom wall of the pot.

The second or storage pot B has a strong cover 22 bolted to the top thereof to seal the same against the admission of air and on it are mounted the various parts which extend into the pot. By this arrangeemnt when the cover is removed, all of the parts may likewise be removed. Another purpose of the cover is to confine a body of non-oxidizing gas under pressure above the molten metal in the pot. 23 indicates numerous immersion heaters in the form of vertical rods carried by the cover and having terminals 24 for connection to an electric source of supply. The pot is provided with a stirrer 25 and a driving motor 26 for the purpose of keeping the hot metal well stirred, especially where alloys are being melted. The pot has an outlet port 30 controlled by a valve 31 which is supported from the cover by means of a plate 32 having a spring suspension 33. This arrangement permits the valve stem to be moved upwardly when the cover is applied in case the valve is in a slightly lower position than it should be, and which also insures proper seating of the valve during operating conditions. It also takes care of expansion and contraction which occur with changes in temperature. The outer exposed end of the valve stem has a gear or sprocket wheel 34 thereon which may be turned by the sprocket 35 and chain 36 as best shown in plan in Fig. 2. By this arrangement, the operation of the valve is facilitated without the operator having to reach over the hot cover. In addition to the immersion heaters 23, an auxiliary heater 23ᵃ is provided and located between the lining and the bottom of the pot. Its purpose is the same that of auxiliary heater 20 located under the melting pot. The auxiliary heaters for the several pots may be made as a single unit or of a number of smaller units.

The pouring section or pot C comprises a casing 37 mounted upon the framework 8 and containing a lining 38 of suitable heat insulating material. 39 indicates the pot which may be of cast iron. The top of the pot is provided with a cover 40 which is bolted thereto in a manner effectively to seal the pot. The cover carries immersion heaters 41, a stirrer 42 and its driving motor 43. Under the pot, between it and the lining of the casing, is located an auxiliary electric heater 41ᵃ which has the same purpose as auxiliary heaters 20 and 23ᵃ. The pot is connected to the storage pot by a conduit 44 located within a heat insulated enclosure 45. Around the conduit is an electrical heating unit 46 to prevent undue cooling of the metal as it is poured from one pot to the other. The pot has a flanged opening 47 to receive a similar flange on the conduit 44. The parts are located in an opening 48 in the wall of the casing and lining to facilitate removal of the parts when necessary or desirable. The pouring pot C is desirably located below the level of the molten metal in the receiving or storage pot B so that the metal will flow from the latter by gravity. This action may be augmented to a limited degree by the gas pressure in the pot B. During the passage of molten metal into the pouring pot C, its gas pressure will be reduced to a value approximately that in the storage section or pot B. As will be noted from Fig. 1, the pouring pot C is thermally separated from the storage pot B so that the temperatures of the pots may be more accurately as well as independently controlled. For this purpose, the pot is surrounded with a thick body of heat insulating material 38, a portion of which is located between the adjacent surfaces of the two pots.

The pouring section or pot C has a special form of removable discharge spout which is self-draining. It comprises two legs or portions, the portion 49 being in the form of a depending tube, the lower end of which terminates well below the level of the molten metal and near the bottom of the pot so that the lead levels in the pots can be lowered while operating prior to complete drainage thereof. The upper portion 50 is connected to the tube at a point outside of the casing and extends downwardly for the necessary distance. It is from this portion that the molten metal is supplied to the cylinder of a lead press used in forming sheaths for cables. The two legs or portions of the spout are so arranged as to be self draining when the gas pressure is shut off from the pouring pot. The metal contained in the portion 49 drains back into the pot while any metal contained in the portion 50 drains into the press cylinder or other part receiving the molten metal. In order to prevent air from passing through the discharge spout parts 50 and 49 and acting on the hot metal contained in the pot C, the spout at the apex of its two legs has a chambered extension or part 51 into which extends a pipe 52 for supplying a neutral gas under sufficient pressure and amount to form a seal for the spout. At the end of the pipe is a check valve 53 which is closed automatically by the molten lead which is thereby prevented from entering the pipe when the necessary higher pressure gas is admitted to the pot C to cause discharge of the metal through the spout. The rate of flow of lead is controlled by the rate of admission of gas to pot C.

As it is necessary or desirable from time to time to clean the pots either separately or otherwise, the melting pot A has a drain pipe 55, Fig. 1, discharging into a suitable receptacle, not shown. It is provided with a valve similar to valve 12, its operating stem being indicated at 56 in the plan view, Fig. 2. The middle or storage section or pot B drains into the pouring section or pot C through the conduit 44. The pouring pot C has a drain pipe 57 discharging into a suitable receptacle, not shown. It is controlled by a valve 58, the stem of which is supported by the cover 40 in the same manner and for the same reasons as valve 31 and its stem of the middle pot B. On the top of the valve stem is a sprocket wheel 59 that is actuated by a sprocket wheel 60 moved by hand and a chain 61, as shown in Fig. 2. This plan view also shows the distribution of the immersion heaters of the storage and pouring pots.

Reference has been made to the use of non-oxidizing gas in the storage and pouring pots. The piping is shown diagrammatically in Fig. 4. 62 indicates the main supply pipe which for illustration may supply gas under 40 pounds per square inch. The gas passes through a shut off valve and a reducing valve 63 set for the desired operating pressure, say 20 pounds, into the pouring pot C. A branch pipe 64 supplies gas to the storage pot B through a shut off valve and a reducing valve 65, set for example at 4 pounds per square inch and such pressure is constantly maintained in the storage pot B above the molten lead therein. From the branch pipe is a second branch pipe 66 for supplying gas to the discharge spout of the pouring pot through pipe 52 and check valve 53. The branch pipe is also adapted to receive gas from the main supply pipe through a three way valve 67. Shut off valves 68 are provided in the piping wherever necessary or desirable. 69 indicates a suitable pressure gauge in the main pipe beyond the reducing valve 63 by which the operator may determine the operating pressure in pot C. 70 indicates a water column or gauge for indicating the pressure of the gas supplied to the receiving or storage pot. To purge the pots, higher than normal pressure gas may be admitted thereto by the valve controlled pipes 71 and 72.

Figs. 5 and 6 illustrate diagrammatically the various immersion and auxiliary heaters of which 15 illustrates the immersion heaters and 20 the auxiliary heaters of the melting section or pot A. As shown, the immersion heaters are designed to utilize approximately 48 kilowatts of electric energy and the auxiliary units about 8.5 kilowatts. 23 illustrates the immersion units of the storage section or pot B and are designed to utilize approximately 50 kilowatts of electric energy. The auxiliary units utilize about 8.5 kilowatts. 41 indicates the immersion units of the pouring section or pot and are designed to utilize approximately 30 kilowatts of electric energy. The auxiliary heater 41ᵃ is designed to utilize about 3.5 kilowatts, and the heater 41ᵇ around the upper end of the discharge spout, 2.4 kilowatts and the auxiliary unit 41ᶜ about 3 kilowatts. The immersion units are of sufficient capacity to melt and maintain temperature of lead at the current rate of usage without aid of the auxiliary units. The heating unit 46 around the conduit 45 leading from the receiving to the pouring pot is designed to utilize about 1.2 kilowatts. The part 50 of the pouring spout is surrounded by an electrical heating unit 50ᵃ. Thus it will be seen that each pot is amply supplied with heat at all times so as to preserve the lead to the required temperatures to obtain the best results. The figures given are for the purpose of illustration and not as limitations because a change of capacity of the apparatus would naturally require more or less heat as would also different compositions of the material being melted.

Starting with the apparatus empty the melting pot A is filled with pig lead or other material which pigs rest directly on the immersion heating units 14, 15 with all valves therein closed. Current is admitted to these units and also to the auxiliary units 20. As the lead gradually melts additional lead is added until the pot is filled to its operating level. The molten lead is then allowed to stand for a reasonable length of time to afford an opportunity for the impurities to rise to the top where they may be skimmed off. The valve 12 is then opened to permit molten lead to flow into the receiving or storage pot B, care being exercised not to lower the level sufficiently to permit dross and dirt to flow with the metal into pot B. The valve is then closed and the above operations repeated until the second or storage pot B is filled to the desired operating level. During these operations the heaters of the second pot are in service. The apparatus is now ready for use it being understood that the second and third pots are filled with neutral gas at a pressure slightly above that of the atmosphere and that the heaters of pot C are in operation. The valve 31 is opened to allow molten material to flow into the pouring pot C up to the desired level after which the valve is closed and gas admitted to the pouring pot under sufficiently high pressure to cause the molten metal to be discharged upwardly and then downwardly through the pouring spout. The pouring spout is so designed that it can be easily removed from pot C if cleaning is necessary or desirable. After the press cylinder or other receptacle is filled with the molten material the pot C is relieved of its gas pressure and pouring ceases, the parts of the spout freely draining and because they are well heated no residue of material will remain therein. As soon as the molten material ceases to flow through the spout the check valve 53 automatically opens to discharge neutral gas under low pressure which fills the spout and acts as a seal to prevent the admission of air to the pouring pot C. The valve 31 is again opened and the pouring pot refilled. The above described operations are repeated from time to time. Pig lead is added to the melting pot as required and the port between pots A and B is kept open during operation and lead is fed into pot A at approximately the same rate that it is poured from pot C. The rate of flow through the spout of the pouring pot is controlled by varying the gas pressure therein. To relieve the gas pressure on the pouring pot after a filling operation, the three way valve 67 is turned back from its fully open position to its normal position and low pressure gas is allowed to flow into the pouring pot C and the spout from which latter it escapes to atmosphere whereupon the gas pressures in the receiving and pouring pots will return to normal. Relief valves 73 and 74, Fig. 4, are also provided to prevent excessive gas pressures in the pots.

Desirably each pot is under separate automatic control as to temperature and in usual practice the temperatures will be different for the different pots. For this purpose each pot is provided with a thermo couple or equivalent device 80, Fig. 3, which in turn controls the current regulating devices of the heaters in any suitable or well known way.

The pots may be drained for cleaning either separately or collectively by opening the drain valves. If separately cleaned, the valves controlling the flow of molten material from one pot to the other, will be closed during the operation. When it is known that pots are to be drained, it is possible and desirable to lower the lead level by normal usage to about one-third the total capacity of the pots leaving only a small balance to be drained off in order to empty the pots.

A distinct and substantial advantage of my improved construction resides in the fact that there are no valves through which the molten materials must flow on its way from a heated pot and spout into the cylinder of a press or other receiver, as in prior constructions. The use of such valves is objectionable in that they become clogged with oxide formation, dirt and other impurities, especially in the region of their seats and the passages so valved are difficult to clean. By using a self-draining spout and neutral gas under pressure, as previously described, the objection above noted is entirely overcome and the spout, having no obstructions, may readily be cleaned. The rate of flow of molten material through the spout is wholly controlled by changing the gas pressure within the pouring pot. When the pressure is reduced to a value where it can no longer support the vertical column of material within the spout flow ceases and the legs of the spout will fully drain. The presence of neutral gas within the spout after discharge ceases prevents the admission of air to the spout and pouring pot and hence the formation of oxides.

My improved construction has many additional advantages of which the following are specifically mentioned:

(a) Uniform rate of melting.

(b) Long period of time for flotation of dirt and dross, with separate places where this can take place.

(c) Individual temperature control of the pots.

(d) Separate pouring section or pot so that the temperature of the material therein is not affected by a change of temperature in the other pots; also that the heating thereof can be regulated or controlled.

(e) Gas coverings for the molten material after it leaves the melting pot; including a gas sealed pouring spout to prevent oxidation of the material in the pouring pot and spout.

(f) Relatively small percentage of material poured at any one time which prevents large temperature variations in any pot due to newly melted material.

(g) Separately controlled stirring device in each pot to prevent segregation of metals when alloys are being melted.

(h) Facilities for draining the pots separately or collectively.

(i) Ability to pour at whatever rate is desired by varying the gas pressure on the pouring pot.

(j) Removable conduit between receiving and pouring pots and removable pouring spout to facilitate cleaning.

(k) Ability to pour lead always at any predetermined temperature which can be always maintained.

What I claim as new and desire to secure by Letters Patent of the United States is:

1. Melting apparatus comprising an open melting pot, a second pot receiving molten material from the first, a sealed pouring pot receiving molten material from the second pot, casing means for the pots, immersion electric heaters within each of the pots, a self draining discharge spout for the pouring pot having an upwardly extending portion, the lower end of which is normally submerged in the molten material, and a second portion extending downwardly from the first, the union of the two portions being located above the level of the molten material, means supplying a non-oxidizing gas to the pouring pot under sufficient pressure to force molten material upwardly and then downwardly through the portions of the discharge spout, and other automatically acting means directly opening into the spout for supplying a non-oxidizing gas thereto to prevent admission of air to the pouring pot and spout when the gas pressure on the molten material within the pouring pot is so reduced as to stop the flow of molten metal through the spout.

2. Melting apparatus comprising a heated melting pot, a sealed storage pot of substantially greater capacity than the melting pot and receiving material therefrom, a heated pouring pot receiving molten material therefrom, a self-draining pouring spout for the pouring pot having downwardly extending open ends, a valve controlled conduit for supplying the pouring pot with neutral gas under sufficient pressure to force the molten material upwardly through the spout, a second conduit for supplying neutral gas to the spout, and a self-opening valve in the conduit which is held closed by the flowing material and automatically opens when the flow of molten material through the spout ceases and admits gas to the spout in a manner to cause it to seal the spout against the admission of air to the pouring pot.

3. Melting apparatus comprising a heated melting pot, a sealed storage pot of substantially larger capacity than the melting pot and receiving material therefrom, a heated pouring pot of smaller capacity receiving molten material from the storage pot, a conduit for supplying a neutral gas to the pouring pot for discharging molten material therefrom, a self draining spout for the pouring pot having two downwardly extending legs through which molten material is discharged, the two legs being connected at their upper ends and open at their lower ends, one inside the pot and the other outside thereof, a part having a chamber in free communication with the region of union of the legs, a conduit admitting neutral gas to the chamber and the legs to form a gas seal and prevent admission of air to the pouring pot, and a valve for the conduit located inside of the chamber which automatically closes when molten material fills the spout and automatically opens when the spout is not filled.

4. Melting apparatus comprising a melting pot, a relatively large heated storage pot receiving material from the heating pot, a smaller heated pouring pot receiving material from the storage pot, removable covers for the storage and pouring pots for sealing them against the admission of air, immersion heaters supported by the covers and removable therewith as a unit, motor driven stirrers mounted on the covers and removable therewith, the stirrers extending into the molten material in the pots, valve means for each pot mounted upon and removable with the covers as a unit for controlling the flow of molten material into and through the storage pot, a discharge spout detachably secured to the cover of the pouring pot, the spout having two legs united at their upper ends above the cover, one of the legs extending into the pot and extending below the level of the molten material therein, and means for supplying neutral gas to the pouring pot under sufficient pressure to cause molten material to flow outwardly through the spout.

5. Melting apparatus comprising a melting pot open to the atmosphere into which the material to be melted is introduced and in which impurities are permitted to float to the top of the melted material, a sealed heated storage pot of substantially greater capacity than the melting pot and receiving material therefrom, a pouring pot of smaller capacity than the storage pot and receiving material therefrom, the storage and pouring pots operating at substantially uniform temperatures, a separate heating means for each of the pots whereby the temperatures thereof may be independently controlled, ports located at the bottoms of the melting and storage pots through which the material flows, valves for the ports, the seats of which are always submerged in the hot material to insure proper seating of the valves, a means for supplying low pressure non-oxidizing gas to the storage chamber, a means for supplying high pressure non-oxidizing gas to the pouring pot for discharging material therefrom when the port between it and the storage pot is closed, and a self draining discharge spout for the pouring pot having an upwardly extending portion, the lower end of which is permanently submerged in the material and a downwardly extending portion opening into the first and located outside of the pot.

6. Melting apparatus comprising a pot open to the atmosphere for receiving the material to be melted, electrical heating means within the pot which support the unmelted material above the bottom of the pot and by so doing impart heat directly to the material, the means also facilitating the rise of impurities to the top of the charge, a sealed storage pot of greater capacity than the melting pot, a pouring pot of smaller capacity than the storage pot, separate electrical heating means for the storage and pouring pots located within the pots and partly submerged in the contents thereof, communicating ports between the pots, valves for the ports, the seats of which are always submerged in the hot material to insure proper seating of the valves, means for supplying the storage pot with low pressure non-oxidizing gas, means for supplying the pouring pot with high pressure gas to discharge material therefrom when the port opening into it from the storage pot is closed, and a self draining discharge spout for the pouring pot having two portions, one of which is within the pot and extends upwardly from below the level of the molten material therein and the other opening into the first and located outside of the pot and extending downwardly with respect to the first.

7. Melting apparatus comprising a melting pot which is exposed to the atmosphere at the top to permit insertion of the charge to be melted and to permit the surface of the melted charge to be skimmed, a sealed metal storage pot of such greater capacity than the melting pot that the contents thereof will remain at a substantially constant temperature during the admission of successive charges of melted material thereto and the discharge therefrom, a sealed metal pouring pot, independent removable metal covers for the storage and pouring pots, immersion heaters wholly supported by the covers and removable as a unit therewith, casings for the storage and pouring pots, auxiliary electric heaters located adjacent the walls of metal pots to assist the immersion heaters when the contents of the pots are cold, a self draining spout for the pouring pot having an upwardly extending portion with its lower end located below the level of the melted material in the pot, valve controlled ports located near the bottoms of the melting and storage pots, a means for supplying low pressure non-oxidizing gas to the storage pot, and a means for supplying non-oxidizing gas to the pouring pot when the port admitting material thereto from the storage pot is closed and under sufficient pressure to force the material therein upwardly through the discharge spout.

8. Melting apparatus including a pouring pot, a self draining spout for discharging molten material therefrom comprising an upwardly extending first leg terminating at its lower end below the level of the molten material in the pot and a second downwardly extending leg terminating outside of the pot, the two legs being connected at their upper ends, a conduit for supplying neutral gas to the pot under sufficient pressure to force the material upwardly through the first leg, a conduit admitting neutral gas to the spout to prevent air from entering the pouring pot when the outward flow of material ceases, and a self opening valve in the spout for controlling the flow of gas from the conduit, the molten material flowing outwardly through the spout holding the valve closed.

9. The method of melting metal for use where the presence of oxides is objectionable which comprises melting the metal in an open pot, skimming the top surface of the metal, transferring the melted metal in relative-small successive charges into a sealed storage pot of much larger capacity than the melting pot, maintaining the contents of the storage pot at a substantially uniform temperature and under a low pressure neutral gas to prevent oxidation, transferring metal from the storage pot into a much smaller pouring pot containing a neutral gas by relatively small successive charges so as not to materially change the temperature of the metal in the storage pot, shutting off communication between the pots, and subjecting the filling pot to a higher pressure than that in the storage pot to force the charge of molten metal out of the pouring pot.

10. The method of melting metal for use where the presence of oxides is highly objectionable which comprises introducing the metal to be melted into an open pot, skimming the molten metal, transferring molten metal from a point below the level of the metal in the open pot into a sealed storage pot of substantially greater capacity, maintaining the storage pot at a substantially constant temperature, admitting low pressure neutral gas to the storage pot to prevent oxidation of the metal therein, transferring the metal by gravity into a filling pot of smaller size containing neutral gas at approximately the same pressure as that in the storage pot, shutting off communication between the pots, supplying gas under sufficient pressure to the pouring pot to force the molten metal therein out through a discharge opening, and discharging gas into the opening under sufficient pressure to prevent atmospheric air from entering the pouring pot through said opening.

11. The method of melting easily oxidizable metals by means of a melting pot exposed to atmospheric conditions, a sealed storage pot of substantially larger size than the melting pot containing a non-oxidizing gas and a pouring pot of less capacity than the melting pot also containing a non-oxidizing gas, which comprises heating all of the pots to maintain the contents thereof at the desired temperatures, causing metal from the storage pot to flow into and fill the pouring pot, causing metal to flow from the melting pot into the storage pot in amount substantially equal to that contained in the pouring pot, shutting off communication between the storage and pouring pots, subjecting the pouring pot to the effects of a non-oxidizing gas under sufficient pressure to discharge molten metal therefrom through its outlet, and sealing the outlet of the pouring pot to prevent the entrance of air thereto while it is being filled.

12. Melting apparatus comprising a heated melting pot, a sealed heated storage pot of substantially greater capacity than the melting pot and receiving molten material therefrom, a heated pouring pot thermally insulated from the other pots and receiving molten metal from the storage pot, the pouring pot being of substantially smaller capacity than the storage pot, a spout for the pouring pot having open ends and an intermediate elevated portion above the level of the material in the pot, the spout draining partly back into the pot and partly to the outside thereof, a conduit for supplying the pouring pot with gas under sufficient positive pressure to force molten material upwardly and through the spout, and conduit means for supplying gas under positive pressure directly to the spout when the flow of molten material therefrom ceases in a manner to form a gas seal therein and thereby prevent air from entering the pouring pot and the spout.

13. Melting apparatus comprising a melting pot, a storage pot sealed against the admission of air which is of substantially greater capacity than the melting pot, a valved conduit below the normal level of the materials in the pots through which molten material flows into the storage pot, a pouring pot thermally insulated from the melting and storage pots and receiving material from the latter, a conduit between the storage and pouring pots, independent controllable heating means for each of the pots, a self-draining spout for the pouring pot comprising a downwardly extending portion, one end of which is submerged in the molten material in the pot and a second downwardly extending portion terminating outside of the pot where it is exposed to air, conduit means for supplying gas to the pot under sufficient positive pressure to force material upwardly therefrom into and through the spout, and conduit means for supplying gas to the spout in a manner to seal it and prevent air from entering it and the pouring pot when the flow of molten material therefrom ceases.

14. Melting apparatus for easily oxidizable materials comprising a melting pot, the top surface of which is exposed to the atmosphere, a closed storage pot of materially larger capacity than the melting pot and receiving molten material therefrom, independent controllable heating means for each of the pots, conduit means for supplying the storage pot with a neutral gas under low positive pressure, a pouring pot receiving molten material from the storage pot, the capacity of which is only a fraction of that of the storage pot, independent controllable heating means for the pouring pot, a self draining pouring spout, one end of which is submerged in the molten material in the pot, the other end terminating outside of the pot where it is exposed to atmospheric air, controllable conduit means for supplying a neutral gas to the pouring pot under such positive pressure as to force the material outwardly through the spout, and conduit means automatically supplying sufficient neutral gas to the spout to seal it when the outward flow of material therefrom ceases.

15. The method of melting easily oxidizable metals which comprises melting the metal in a first container, withdrawing metal from the first container and delivering it to a second container containing a larger amount of the same molten metal, maintaining the metal in the second container under low positive pressure non-oxidizing gas, withdrawing molten metal from the second container and delivering it to a third container, subjecting the metal in the third container to a higher pressure of non-oxidizing gas than in the second container for discharging it therefrom through an opening, and supplying non-oxidizing gas to the discharge opening to prevent the entrance of atmospheric air into the third container when the outward flow of metal therefrom stops.

ERNEST W. CLARK.